R. A. WALDMAN.
MILK BOTTLE CASE.
APPLICATION FILED OCT. 5, 1914.
1,220,301.
Patented Mar. 27, 1917.
2 SHEETS—SHEET 1.
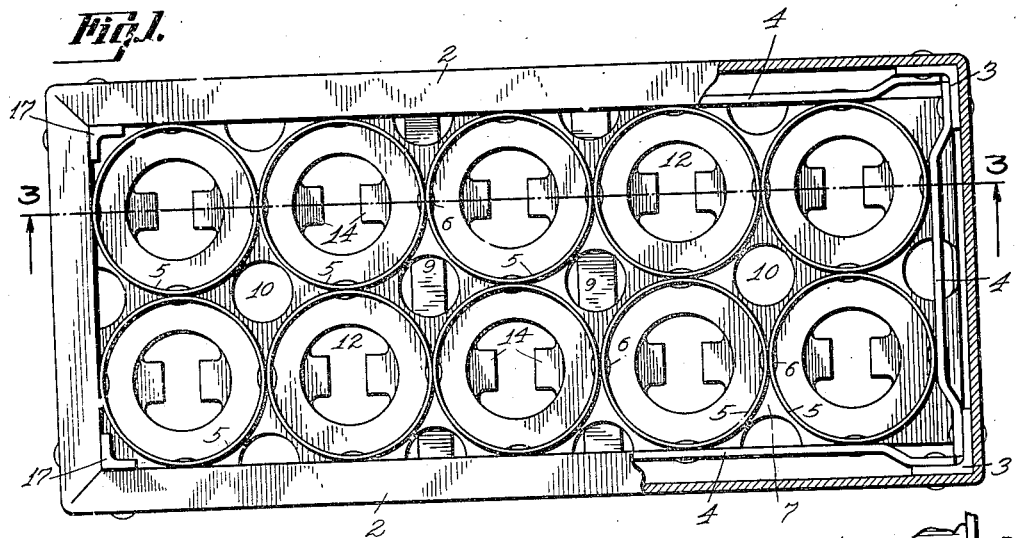
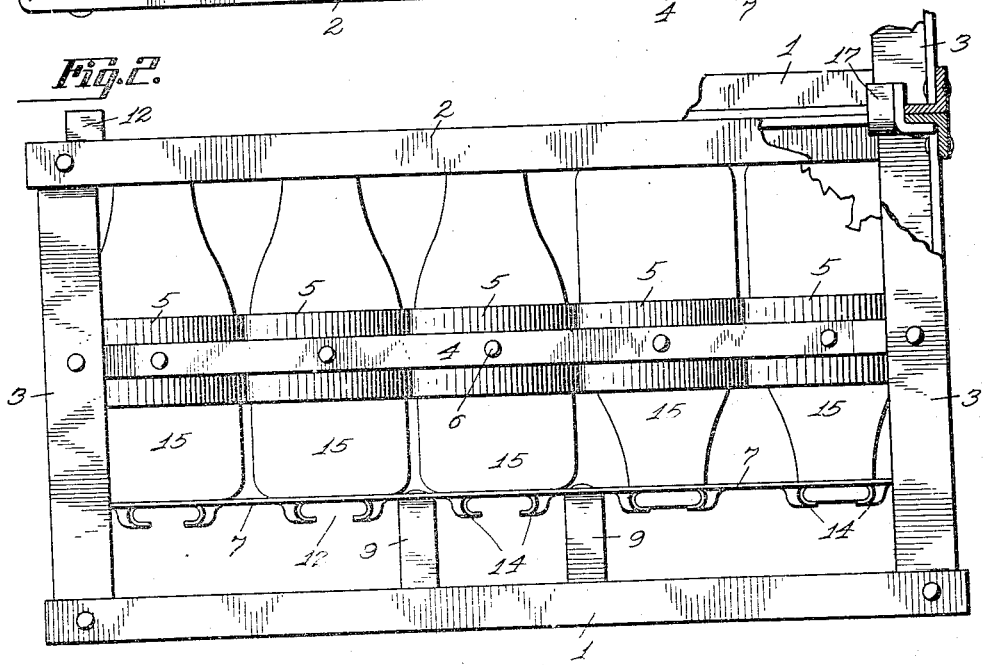
Witnesses
Inventor
Ralph A. Waldman
By Arthur L. Slee
HIS ATTY

R. A. WALDMAN.
MILK BOTTLE CASE.
APPLICATION FILED OCT. 5, 1914.

1,220,301.

Patented Mar. 27, 1917.
2 SHEETS—SHEET 2.

Witnesses.

Inventor.
Ralph A. Waldman
By Arthur L. Slee
His Atty

UNITED STATES PATENT OFFICE.

RALPH A. WALDMAN, OF SAN FRANCISCO, CALIFORNIA.

MILK-BOTTLE CASE.

1,220,301.  Specification of Letters Patent.  Patented Mar. 27, 1917.

Application filed October 5, 1914. Serial No. 865,198.

*To all whom it may concern:*

Be it known that I, RALPH A. WALDMAN, a citizen of the United States, residing in the city and county of San Francisco and State of California, have invented a new and useful Improvement in Milk-Bottle Cases, of which the following is a specification.

My invention relates to milk bottle cases wherein an open frame-work of suitable design is provided with a series of united rings, adapted to receive milk bottles and the like, and a perforated base plate adapted to support the bottles; and the objects of my invention are first, to provide an improved milk bottle case, by means of which empty milk bottles may be transported through the various processes of washing, filling, and refrigerating; and second, to provide an improved milk bottle case adapted to receive and retain milk bottles in either an upright or inverted position.

I accomplish these several features by means of the device disclosed in the drawings forming a part of the present specification, wherein like characters of reference are used to designate similar parts throughout the said specification and drawings, and in which—

Figure 1 is a plan view of my improved milk bottle case having one end thereof partly in section in order to disclose the manner in which the rings are secured to the frame-work of the bottle case.

Fig. 2 is a side elevation of my improved milk bottle case, the upper right hand corner of which is partly broken away in order to illustrate the manner in which one case is alined or stacked upon another.

Figure 3:
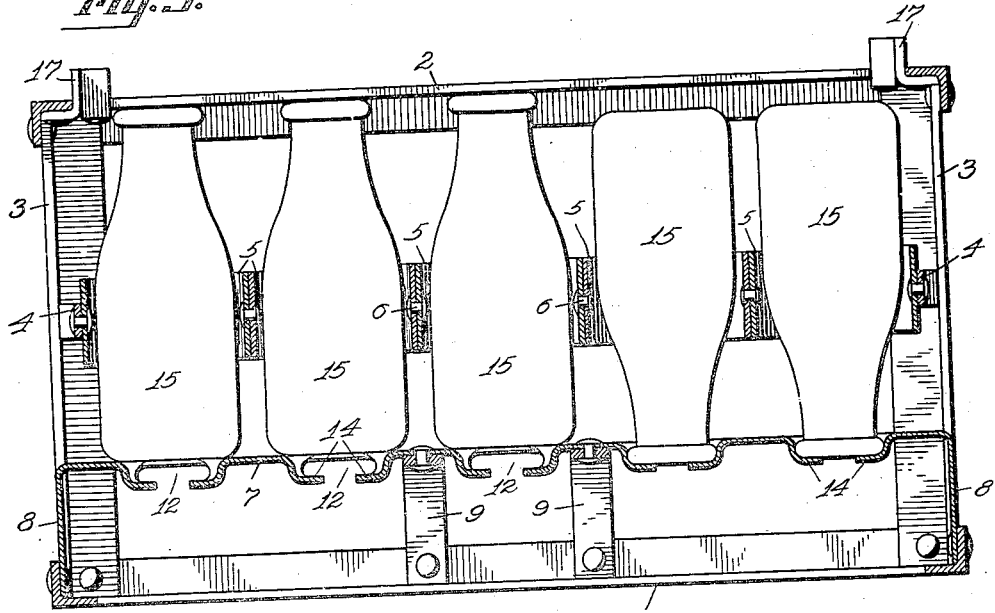
Figure 4:
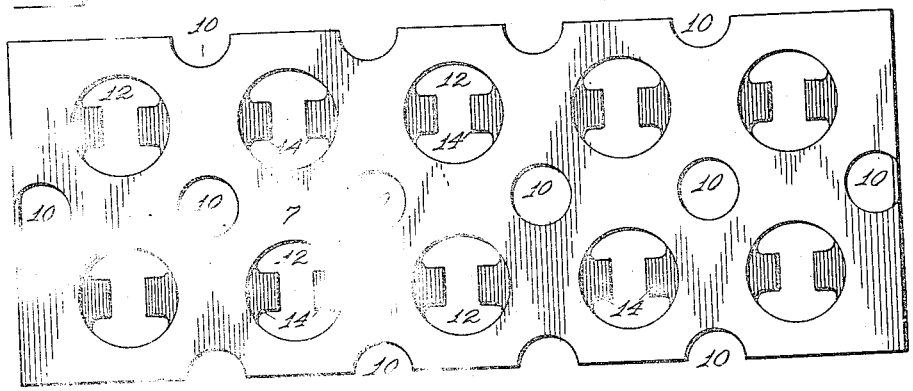

Fig. 3 is a longitudinal sectional view taken on line 3—3 of Fig. 1 of the drawings in the direction indicated by the arrows, disclosing the manner in which the perforated bottom or supporting plate is secured to the frame and several bottles within the said frame, two of which are shown in an inverted position as they would appear when the bottle case is being transported through the washing machine; and Fig. 4 is a plan view of the perforated bottom or supporting plate separated from the frame-work of the milk bottle case, disclosing the perforations therein and the hooks within the perforations, by means of which the bottles may be supported in an inverted position and at the same time provide access to the interior of the bottles.

Referring by number to the drawings, 1 designates a lower rectangular frame made preferably of angle iron with its horizontal leaf projecting inward and its upright leaf rising from its angle as best seen in Fig. 3, and 2 designates an upper rectangular frame made also of angle iron with its horizontal leaf projecting inward and its upright leaf projecting downward from its angle as best seen in the same view. The upright leaves of these frames are in alinement with each other all the way around the structure, and at the corners of the same are what I call posts 3 preferably also of angle iron and with their leaves fitting inside the upright leaves of the upper and lower frames and their extremities standing beneath and resting upon the horizontal leaves of said frames respectively. The posts may be riveted at their ends within the frames as shown.

At about midway the height of the structure thus built up are what I call the intermediate supporting bars 4, four in number and preferably each of strap iron. Each bar may well be riveted at its ends to the leaves of two contiguous posts, with its body between said ends deflected inward as best seen in Fig. 1—my purpose being that the bodies of these bars shall define a space which is of the same size as defined by the inner edges of the horizontal leaves of the upper and lower frames. Within such space is a series of rings 5 (ten of these are shown illustrated in Fig. 1, but I do not wish to be limited to that number) the rings being riveted to the supporting bars 4 and to each other as indicated at 6. Each ring is of a size to freely receive the body of a milk bottle as seen in Fig. 3, and yet the rings hold the various bottles from contact with each other, whereas the inbent body portions of the supporting bars 4 hold the group of bottles from contact with a similar group in another case which might stand adjacent or with anything which might be stored or moved against this milk bottle case. Obviously the bottles can be inserted into the rings and withdrawn therefrom by passing them through the upper rectangular frame 2.

At a proper distance below the intermediate bars 4 is secured a bottle supporting plate 7, the ends 8 of the said supporting plate 7 being turned downward and secured to the ends of the lower frame 1. Suitable intermediate supports 9 are secured to the sides of the lower frame 1 and upbent between said sides to engage and support the supporting plate 7. The supporting plate 7 is provided with a number of apertures 10 for the purpose of decreasing the weight of the said plate. The said plate 7 is also provided with a second series of apertures 12 which are arranged directly under the rings 5, secured to the intermediate bars 4.

The apertures 12 are provided in opposite edges with pendant hooks 14 having inwardly projecting bills, the purpose of which will be hereinafter more fully described.

The diameters of the apertures 12 of the supporting plate 7 are slightly less than the diameter of the bottom of a milk bottle 15 so that when the said milk bottle 15 is in an upright position it will rest on the surface of the supporting plate 7, as disclosed in the left hand end of Figs. 2 and 3 of the drawings; but the said apertures 12 are slightly larger than the diameter of the top of a milk bottle 15 so that when the said milk bottle 15 is inverted the top thereof will pass through the apertures 12 and be supported by the inwardly projecting hooks 14 therein, as disclosed in the right hand ends of Figs. 2 and 3 of the drawings.

The bills of the hooks 14 do not extend entirely across the apertures 12 so that a stream of water is free to pass between them and into the bottle 15 when the milk bottle case is being transported through the washing machine.

It is evident that the several apertures in the plate 7 will provide a means whereby the supporting plate 7 may be properly drained after the milk bottle case and the bottles therein have passed through the washing process.

Secured within each corner of the upper frame 2 is a small angle 17 projecting above the upper surface of the said upper frame 2 to a less height than the distance of the plate 7 above the bottom of the case, and adapted to engage each inner corner of the lower frame 1 of a similar milk bottle case placed above it, as disclosed in the upper right hand corner of Fig. 2 of the drawings. In this manner the cases are kept in alinement when one is stacked upon another.

The open metallic construction of the device provides a sanitary milk bottle case that is adapted to retain and transport milk bottles through the various stages from the time that the empty milk bottle is received from the consumer, washed, filled, capped, refrigerated and again returned to the wagons for distribution. It is also obvious that the open construction will readily permit the free circulation of cold air around the bottles within the case. It is also obvious that the bottles may readily be placed in the milk bottle case and retained therein either in an upright or inverted position, and while in said inverted position permitting free access for cleansing purposes.

I am aware that the present state of the art discloses open milk bottle cases similar in construction and having various means for retaining milk bottles therein. Therefore, I do not wish to claim as my invention such a combination broadly, but what I do claim and desire to secure by Letters Patent is—

1. A milk bottle case comprising upper and lower rectangular frames of angle iron with their upright leaves at the outside and in line with each other and their horizontal leaves projecting inward, posts at the corners secured within the upright leaves of said frames and resting respectively beneath and upon the horizontal leaves thereof, intermediate supporting bars connected at their ends to said posts and with their centers deflected inward beyond the planes of the upright leaves of said frames, a series of rings connected with each other and with said bars, and a bottle support disposed within the structure and having apertures respectively in line with the rings and each of a size to receive a bottle neck, for the purpose set forth.

2. A milk bottle case comprising upper and lower rectangular frames of angle iron with their upright leaves at the outside and in line with each other and their horizontal leaves projecting inward, angle iron posts at the corners secured within the upright leaves of said frames and resting respectively beneath and upon the horizontal leaves thereof, intermediate supporting bars connected at their ends to said posts and with their centers deflected inward to aline with the inner edges of the horizontal leaves of said frames, a series of rings connected with each other and with said bars, a supporting plate disposed within the structure beneath said series of rings and having apertures respectively in line therewith and each of a size to receive a bottle neck, and pendant hooks around each aperture having inturned bills, for the purpose set forth.

In witness whereof I have hereunto set my signature in the presence of two subscribing witnesses.

RALPH A. WALDMAN.

Witnesses:
IRENE DOWNEY,
JAMES F. McCUE.